(12) United States Patent
Gifford et al.

(10) Patent No.: US 8,607,188 B2
(45) Date of Patent: Dec. 10, 2013

(54) MODELING TASK-SITE ALLOCATION NETWORKS

(75) Inventors: Wesley M. Gifford, Hawthorne, NY (US); Nanjangud C. Narendra, Bangalore (IN); Karthikeyan Ponnalagu, Tamil Nadu (IN); Nianjun Zhou, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 148 days.

(21) Appl. No.: 13/225,739

(22) Filed: Sep. 6, 2011

(65) Prior Publication Data

US 2013/0061203 A1 Mar. 7, 2013

(51) Int. Cl.
*G06F 9/44* (2006.01)

(52) U.S. Cl.
USPC .......................................................... 717/103

(58) Field of Classification Search
USPC .......................................................... 717/103
See application file for complete search history.

(56) References Cited

U.S. PATENT DOCUMENTS

| | | | |
|---|---|---|---|
| 7,860,810 B2 | 12/2010 | Raffo | |
| 2003/0105868 A1* | 6/2003 | Kimbrel et al. | 709/226 |
| 2008/0134134 A1 | 6/2008 | Avritzer et al. | |
| 2010/0057514 A1 | 3/2010 | Chee et al. | |
| 2010/0162200 A1 | 6/2010 | Kamiyama et al. | |

OTHER PUBLICATIONS

Lamersdorf, Ansgar et al.; "Estimating the Effort Overhead in Global Software Development"; 2010 International Conference on Global Software Engineering; May 21, 2010; pp. 267-276.*

Peixoto, Carlos Eduardo Lima et al.; "Effort Estimation in Global Software Development Projects: Preliminary Results from a Survey"; 2010 International Conference on Global Software Engineering; May 21, 2010; pp. 123-127.*

Keil, Patrick et al.; "Cost Estimation for Global Software Development"; EDSER'06 (Economics-Driven Software Engineering Research Conference); May 27, 2006; Shanghai, China; pp. 7-10.*

Barcus et al., Supporting the Allocation of Software Development Work in Distributed Teams with Multi-Criteria Decision Analysis, Omega, 36, p. 464-475. Nov. 2006.

Lamersdorf et al., Tamri: A Tool for Supporting Task Distribution in Global Software Development Projects, REMIDI 2009, Limerick, Ireland. Jul. 2009.

Agerfalk et al., A Framework for Considering Opportunities and Threats in Distributed Software Development, 2005.

Jalote et al., Assigning Tasks in a 24-hour Software Development Model, APSEC 2004 Proceedings of the 11th Asia-Pacific Software Engineering Conference.

(Continued)

*Primary Examiner* — Wei Zhen
*Assistant Examiner* — Clint Thatcher
(74) *Attorney, Agent, or Firm* — Ryan, Mason & Lewis, LLP (57) ABSTRACT

A method, an apparatus and an article of manufacture for modeling a task-site allocation. The method includes generating a task-site allocation network based on at least one site-task pair and at least one site-centric constraint of at least two sites, wherein generating a task-site allocation network comprises generating a task-specific constraints model based on task context information and generating a task-site pair that satisfies at least one constraint based on the task-specific constraints model, and determining a preferred allocation of task to site by comparing estimated task-site allocation cost between a single site allocation and a distributed site allocation among the at least two sites.

19 Claims, 3 Drawing Sheets

(56) References Cited

OTHER PUBLICATIONS

Herbsleb et al., An Empirical Study of Speed and Communication in Globally Distributed Software Development, IEEE Transactions on Software Engineering, vol. 29, No. 6, Jun. 2003.

Czekster et al., Performance Analysis of Global Software Development Teams Using a Structured Stochastic Modeling Formalis, IET Software Journal, 2010.

Lamersdorf et al., Model-Based Task Allocation in Distributed Software Development, Seafood 2010 Workshop.

Herbsleb, Global Software Engineering: The Future of Socio-technical Coordination, FOSE 2007 Workshop, ICSE 2007.

Carmel et al., Follow the Sun, Workflow in Global Software Development, Journal of MIS, 2010.

\* cited by examiner

|  | COMMUNICATION | LANGUAGE/CULTURAL | TIME ZONE | TRAVEL | PROCESS |
|---|---|---|---|---|---|
| HAND-OFF | H | M | H | H | M |
| CONSULTATION | M | M | H | L | L |
| INTEGRATION | H | M | H | M | M |

|  | COMMUNICATION | LANGUAGE/CULTURAL | TIME ZONE | TRAVEL | PROCESS |
|---|---|---|---|---|---|
| HAND-OFF | H | L | M | M | M |
| CONSULTATION | H | M | H | L | L |
| INTEGRATION | H | L | M | M | M |

MODELING TASK-SITE ALLOCATION NETWORKS

FIELD OF THE INVENTION

Embodiments of the invention generally relate to information technology, and, more particularly, to task-site allocation networks.

BACKGROUND OF THE INVENTION

Many software organizations have adopted global software development—across geographically distributed sites—in order to reduce costs and take advantage of development resources worldwide. However, existing techniques for accurate estimation of such globalized development projects are lacking. For example, current approaches do not adequately take into account globalization-related costs, such as hand-offs between sites, synchronization of development among sites, integration of software developed at distributed sites, language/cultural issues, travel costs, communication costs, etc.

SUMMARY OF THE INVENTION

In one aspect of the present invention, techniques for modeling task-site allocation networks are provided. An exemplary computer-implemented method for modeling a task-site allocation can include steps of generating a task-site allocation network based on at least one site-task pair and at least one site-centric constraint of at least two sites, wherein generating a task-site allocation network comprises generating a task-specific constraints model based on task context information and generating a task-site pair that satisfies at least one constraint based on the task-specific constraints model, and determining a preferred allocation of task to site by comparing estimated task-site allocation cost between a single site allocation and a distributed site allocation among the at least two sites.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps.

Yet further, another aspect of the invention or elements thereof can be implemented in the form of means for carrying out the method steps described herein, or elements thereof; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION OF EMBODIMENTS

As described herein, an aspect of the present invention includes modeling task-site allocation networks (TANs) towards improved project globalization with cost and/or effort estimate guidance. Given a work breakdown structure of tasks in a software development project, along with cost and scheduling constraints and effort estimates of the tasks at a set of geographic sites, an aspect of the invention includes determining an optimal allocation of tasks to sites as well as the effort estimate for that allocation.

As detailed herein, an embodiment of the invention includes modeling task-site allocation in a global software development environment by generating task distribution using site-task pairs, site centric dependencies and constraints, and estimating cost based on a comparison between single-site allocation and distributed sites.

In developing a task-site allocation network, each node in the network is an allocation of a task to a site. Also, the cost of a node is the sum of the following: the effort of executing that task on that site, the consultation costs incurred via communication with other sites, and the integration costs incurred based on hand-off of software artifacts from other sites to the site in question. Each edge $(N_i, N_j)$ connecting two nodes signifies a hand-off of software artifacts from one task to the next—either within a site or across sites. The cost of an edge is the effort for a hand-off from $N_i \rightarrow N_j$.

Additionally, in one or more embodiments of the invention, a task-site allocation network is a directed acyclic graph (DAG) with a single start and a single end node. Further, an optimal task-site allocation is calculated as the shortest path from start to end node.

Accordingly, an aspect of the invention includes modeling and analyzing a task-site allocation and identifying project distribution models. A TAN is generated based on a work breakdown structure (WBS), project data and constraints (including project related, historical data on effort, site/task productivity, inter-site coordination factors, etc.) via the following steps.

Constraint modeling includes generating project context specific constraints model based on effort, cost, schedule, site list, and history. Task-site node generation includes enabling task-site pair generation that satisfies a constraint, based on a generated constraint model for a given task. Edge generation includes generating edges between the generated task-site nodes based on specific task (for example, task group) dependency on locations and inter-site coordination aspects of the constraints. Further, TAN finalization includes filtering unconnected nodes based on the edge generation step.

Additionally, an aspect of the invention also includes enabling listing, storing and selection of multiple project distribution models (for example, identifying the sites to execute from first to last task) based on comparison with other available candidate paths via the following steps. Through TAN navigation, a list of candidate project distribution models with a constraints satisfaction index (all satisfied, some satisfied, and/or none satisfied) are identified. The implications on effort, schedule, and cost for each of the generated distribution models are associated to enable a guided selection. Further, changes in labor availability or productivity in a site may enable a user to select the next possible distribution model.

Figure 1:
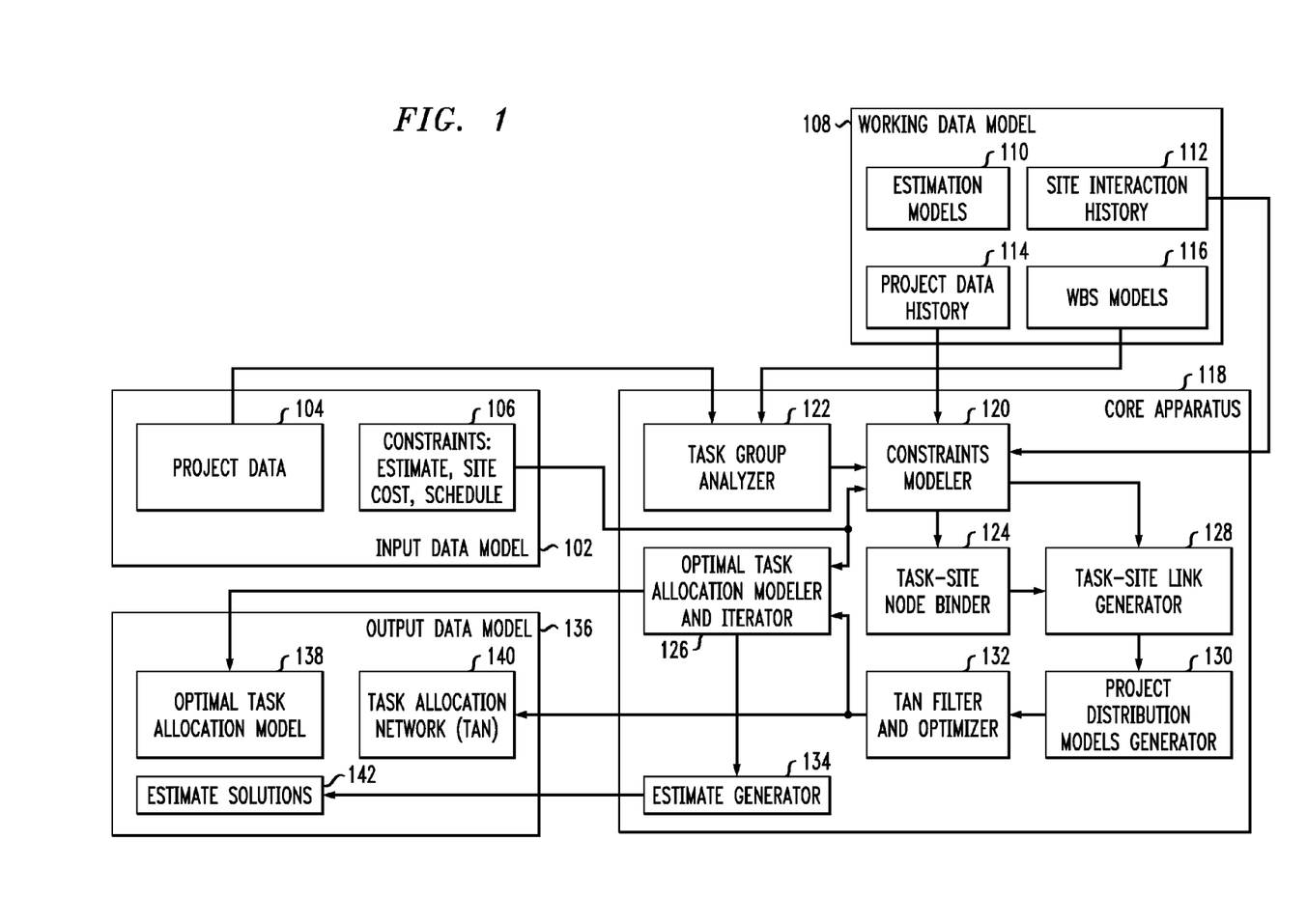
FIG. 1 is a block diagram illustrating an example embodiment, according to an aspect of the invention.

FIG. 1 is a block diagram illustrating an example embodiment, according to an aspect of the invention. By way of illustration, FIG. 1 depicts an input data model 102, which includes project data 104 and constraints 106 such as estimate, site cost, schedule, etc. FIG. 1 also depicts a working data model 108, which includes estimation models 110, site interaction history 112, project data history 114 and WBS models 116. Further, FIG. 1 depicts a core apparatus 118, which includes a constraints modeler module 120, a task group analyzer module 122, a task-site node binder module 124, an optimal task allocation modeler and iterator module 126, and a task-site link generator module 128. The core apparatus 118 further includes a project distribution models generator module 130, a TAN filter and optimizer module 132, and an estimate generator module 134. Additionally, FIG. 1 depicts an output data model 136, which includes an optimal task allocation model 138, a TAN 140 and estimate solutions 142.

Project Data 104 related information such as work breakdown structure, project development type, size, language, application domain is passed on to the Task Group Analyzer module 122, which parses the data for extracting the information related to understanding the tasks and task dependencies and accordingly creates atomic task groups to reflect the project characteristics and to facilitate accurate estimation scope based on the task groups. Based on the possible grouping of tasks and associated dependencies and the project estimation centric constraints provided as an input to the apparatus, the Constraints Modeler module 120 creates the specific constraints in terms of schedule, task execution co-location, cost and effort. The module also validates with the historical data from the executed projects 114 and from the previous site interaction data 112 to verify the validity of the constraints. The Constraints Modeler module 120 also interacts closely with the Task Allocation module 126 and Task Site Link Generator module 128 towards creating the overall Task Allocation Network (TAN) 140. The Task Allocation Modeler module 126, based on the optimized input on parallel executions of multiple projects, helps generate the Optimal Task Allocation Model 138 and generates the estimate accordingly. The Task Site Link Generator 128, with inputs from the Task Site Node Binder module 124, defines the Project Distribution model with the help of Project Distribution Model Generator module 130, which is optimized with the TAN Filter and Optimizer module 132 that subsequently generates the Task Allocation Network 140.

An example task allocation network description can include, by way of illustration, the following. Assume a WBS with four tasks, T1 through T4. Also, assume the following constraints to be honored in decreasing priority: the number of sites is restricted to the United States and India, a site executing high level design (HLD) will also execute low level design (LLD), a site executing coding will also execute testing as one integrated task, and cost restriction to select the least cost value.

Additionally, in this example, a WBS has a distribution of (40, 30, 20, 10) for (HLD, LLD, coding, testing). Assume the following example factor values depicting the weights of the edge in the task allocation network: cost (−2, 2); time zone (−1, 1); availability of labor (−7, 7); and productivity (−3, 3).

Higher values indicate longer virtual distances in terms of cultural differences, time zone, communication, etc.

Accordingly, an example estimate determination can include the following. Let efforts be e(T1)=40, e(T2)=30, e(T3)=20, and e(T4)=10. This reflects, for example, a typical effort split in most software development projects. Also, assume a similar time split among the tasks; that is, t(T1)=40, t(T2)=30, t(T3)=20 and t(T4)=10. For this example, consider two sites (the United States and India) with respective total effort estimates as e(US)=E and e(India)=E'. Assume E'=1.1E without any globalization consideration but just as an effort estimate based on earlier productivity calculation, respectively, that is, E'=E+0.1E.

Figure 2:
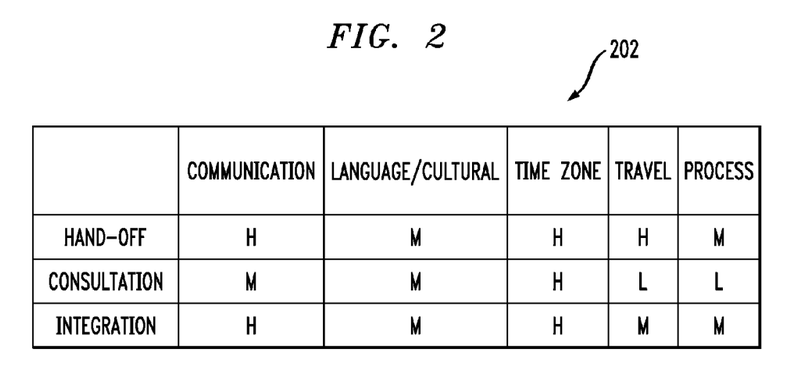
FIG. 2 is a diagram illustrating a table depicting effort impact, according to an embodiment of the present invention.

FIG. 2 considers a sample work distribution scenario between these two sites. FIG. 2 is a diagram illustrating a table 202 depicting effort impact, according to an embodiment of the present invention. According to an embodiment of the invention, a globalization factor, based effort and time impacts as calculated via techniques detailed herein, is applied. As such, the overall effort and time impacts are determined based on the globalization factors.

As illustrated in FIG. 2, consider the following inter-site coordination tasks: Handoff (HA)=10%, Consultation (CO)=10%, and Integration (IN)=10%. Further, consider weights (impact thereof) of the following: H=20%, M=10%, and L=5%%, where H refers to High, M to Medium and L to Low. Accordingly, calculations are made as follows:

Total handoff=0.1(0.2+0.1+0.2+0.2+0.1)=0.08=8%.

Total consultation=0.1(0.1+0.1+0.2+0.05+ 0.05)=0.05=5%.

Total integration=0.1(0.2+0.1+0.2+0.1+ 0.1)=0.07=7%.

Total effort increase=20%.

Figure 3:
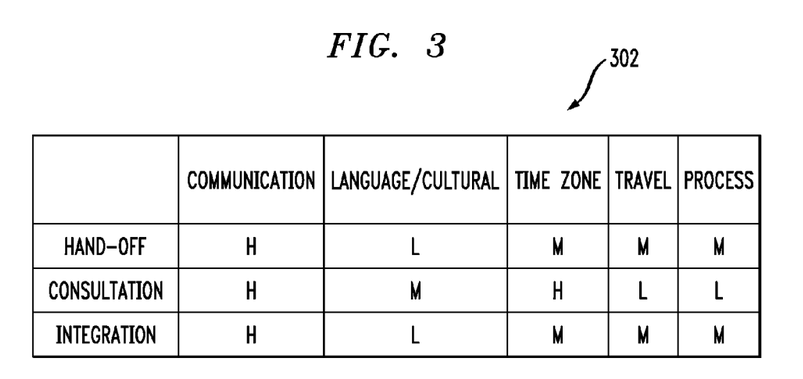
FIG. 3 is a diagram illustrating a table depicting time impact, according to an embodiment of the present invention.

FIG. 3 is a diagram illustrating a table 302 depicting time impact, according to an embodiment of the present invention. Similar to FIG. 2, consider the following inter-site coordination tasks: Handoff (HA)=15%, Consultation (CO)=15%, and Integration (IN)=15%. Further, consider weights (impact thereof) of the following: H=30%, M=15%, and L=10%. Accordingly, calculations are made as follows:

Total handoff=0.15(0.3+0.1+0.15+0.15+ 0.15)=0.1275=12.75%.

Total consultation=0.15(0.3+0.15+0.3+ 0.1+0.1)=0.1425=14.25%.

Total integration=0.15(0.3+0.1+0.15+ 0.15+0.15)=0.1275=12.75%.

Total time increase=39.75%=40%(approximately).

Additionally, in accordance with an aspect of the invention, consider the following example effort calculation. Assume tasks T1 and T4 are executed in the United States and tasks T2 and T3 are executed in India. Total Effort E"=e(T1)+e(T2)+ e(T3)+e(T4). e(T1)=0.4E. e(T2)=0.3E'+0.2(0.3E')=0.36E' (HA, CO, IN considered). e(T3)=0.2E'+0.05(0.2E')=0.21E' (CO considered). e(T4)=0.1E+0.08(0.1E)=0.18E (HA considered). Accordingly, E"=0.4E+0.36E'+0.21E'+ 0.18E=0.58E+0.57E'=0.58+0.57(1.1)E=1.207E. Further, if calculated from a cost perspective, assume that E requires C and E' just 0.3C, then Total Cost=0.721 C, which gives a cost advantage of just 27% against an original assumption of 35%.

Also, further in accordance with an aspect of the invention consider the following example time calculation. Assume tasks T1 and T4 are executed in the United States and tasks T2 and T3 are executed in India. Total Effort T'''=t(T1)+t(T2)+t(T3)+t(T4). t(T1)=0.4T. t(T2)=0.3T'+0.4(0.3T')=0.42T' (HA, CO, IN considered). t(T3)=0.2T'+0.1425(0.2T')=0.2285T' (CO considered). t(T4)=0.1T+0.1275(0.1T)=0.2275T (HA considered). Accordingly, T'''=0.4T+0.42T'+0.2285T'+0.2275T=0.6275T+0.6384T~1.33T.

Additionally, further in accordance with an aspect of the invention consider the following example cost calculation. Assume labor cost in the United States is C, and that labor cost in India is 0.3C (that is, total cost if the project is executed either fully in the United States or fully in India). Total cost=0.58C+0.57(1.1)(0.3C)=0.7681C. Total cost without globalization issues=0.5C+0.5(0.3C)=0.65C. Hence, additional 0.12C (approximately) cost was incurred due to globalization issues.

Figure 4:
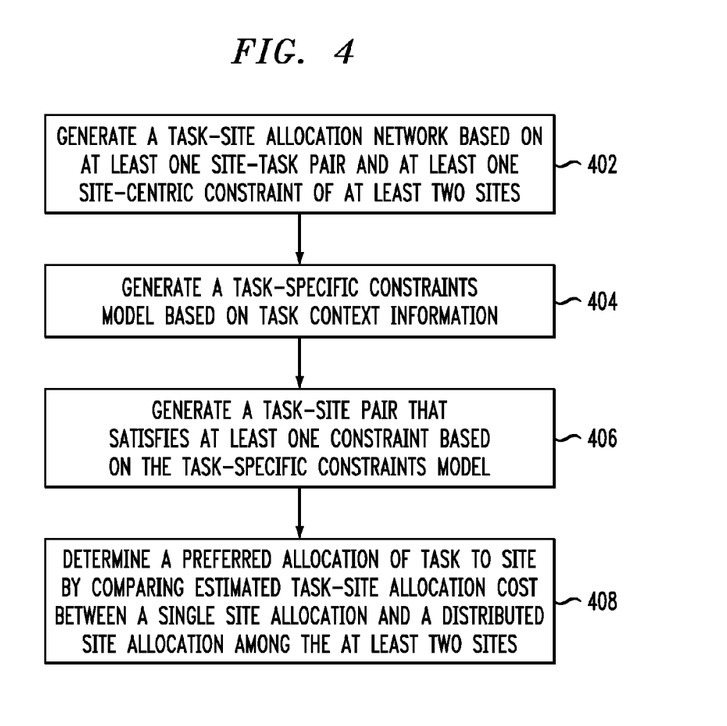
FIG. 4 is a flow diagram illustrating techniques for modeling a task-site allocation, according to an embodiment of the invention.

FIG. 4 is a flow diagram illustrating techniques for modeling a task-site allocation, according to an embodiment of the present invention. Step 402 includes generating a task-site allocation network based on at least one site-task pair and at least one site-centric constraint (task-related historical data on effort, site-task productivity, and an inter-site coordination factors, etc.) of at least two sites. This step can be carried out, for example, using a project distribution models generator module. Generating a task-site allocation network can include filtering unconnected task-site pairs in the network. Also, generating a task-site allocation network can include generating edges between the generated site-task pairs based on task dependency on a location and an inter-site coordination aspect of the constraint.

Step 404 includes generating a task-specific constraints model based on task context information (effort, cost, schedule information, a site list, and historical information, etc.). This step can be carried out, for example, using a constraints modeler module. Step 406 includes generating a task-site pair that satisfies at least one constraint based on the task-specific constraints model. This step can be carried out, for example, using a task-site node binder module.

Additionally, in an embodiment of the invention, the task-site allocation network is a graph, and generating the task-site allocation network includes representing nodes that are unique combinations of a site-task pair (with integrated active estimates based on site-centric trend lines for specific project types) and representing edges that are unique combinations of site-centric dependencies (time zone, cultural, language, etc.) and task-centric dependencies (hand-off, consultation, integration, etc.).

Step 408 includes determining a preferred allocation of task to site by comparing estimated task-site allocation cost between a single site allocation and a distributed site allocation among the at least two sites. This step can be carried out, for example, using an optimal task allocation modeler and iterator module. Determining a preferred allocation of task to site includes navigating the task-site allocation network to identify a list of candidate task distribution models/allocations with a constraints satisfaction index.

The techniques depicted in FIG. 4 also include identifying additional cost of globalization factors on switching between two or more task allocations represented by two or more paths in the task-site allocation network. Additionally, an aspect of the invention also includes enabling a what-if analysis by supporting multiple estimation models, multiple constraints priorities and multiple globalization impact factors (time zone, cultural, language, etc.) in the task-site allocation network.

The techniques depicted in FIG. 4 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In an aspect of the invention, the modules include a constraints modeler module, a task group analyzer module, a task-site node binder module, an optimal task allocation modeler and iterator module, a task-site link generator module, a project distribution models generator module, a TAN filter and optimizer module, and an estimate generator module that can run, for example on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 5:
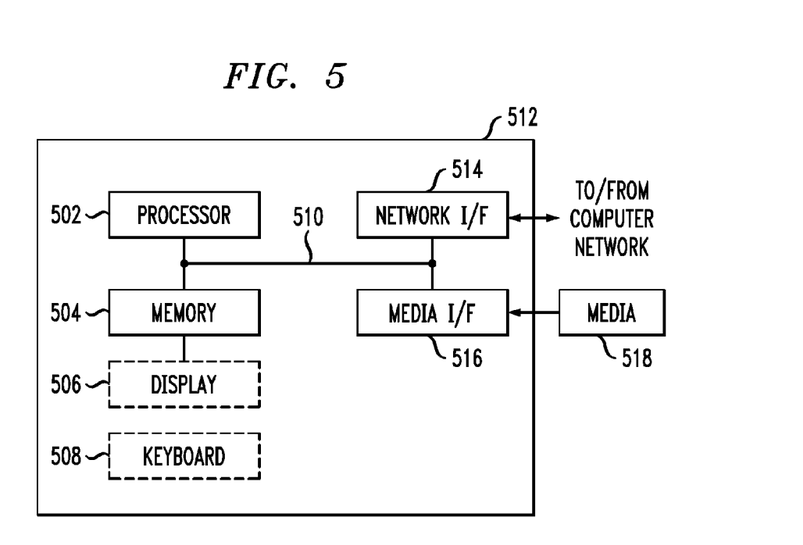
FIG. 5 is a system diagram of an exemplary computer system on which at least one embodiment of the invention can be implemented.

Additionally, an aspect of the present invention can make use of software running on a general purpose computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in an associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

As noted, aspects of the present invention may take the form of a computer program product embodied in a computer readable medium having computer readable program code embodied thereon. Also, any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 1. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one aspect of the present invention may provide a beneficial effect such as, for example, determining an optimal allocation of tasks to sites, and determining the effort estimate for that allocation.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for modeling a task-site allocation, wherein the method comprises: generating a task-site allocation network comprising multiple nodes and multiple edges based on multiple site-task pairs and at least one site-centric constraint of at least two sites, wherein each node in the network represents an allocation of a task to a site and each edge connecting two nodes in the network represents a transfer of one or more software artifacts from one task to another task within a site and/or across sites, and wherein generating said task-site allocation network comprises: generating a task-specific constraints model based on task context information; and generating a task-site pair that satisfies at least one constraint based on the task-specific constraints model; and determining a preferred allocation of task to site by comparing estimated task-site allocation costs between a (i) single site allocation cost determined across one or more of the multiple nodes in the task-site allocation network that encompass the single site allocation and (ii) a distributed site allocation cost determined across at least two nodes of the multiple nodes in the task-site allocation network that encompass the distributed site allocation, wherein the cost associated with each node in the network comprises an effort of executing the corresponding task on the corresponding site, and wherein the cost associated with each edge in the network comprises an effort associated with transferring the one or more software artifacts between the two nodes connected by the edge; wherein at least one of the steps is carried out by a computer device.

2. The method of claim 1, wherein the at least one site-centric constraint comprises at least one of task-related historical data on effort, site-task productivity, and an inter-site coordination factors.

3. The method of claim 1, wherein task context information comprises at least one of effort, cost, schedule information, a site list, and historical information.

4. The method of claim 1, wherein generating a task-site allocation network comprises filtering one or more unconnected task-site pairs in the network.

5. The method of claim 1, wherein generating a task-site allocation network comprises generating edges between the at least one generated site-task pair based on task dependency on a location and an inter-site coordination aspect of the at least one constraint.

6. The method of claim 1, wherein determining a preferred allocation of task to site comprises navigating the task-site allocation network to identify a list of at least one candidate task distribution allocation with a constraints satisfaction index.

7. The method of claim 1, wherein the task-site allocation network is a graph, and wherein generating the task-site allocation network comprises: representing at least one node that is a unique combination of a site-task pair; and representing at least one edge that is a unique combination of site-centric dependencies and task-centric dependencies.

8. The method of claim 1, further comprising identifying additional cost of at least one globalization factor on switching between two or more task allocations represented by two or more paths in the task-site allocation network.

9. The method of claim 1, further comprising enabling a what-if analysis by supporting multiple estimation models, multiple constraints priorities and multiple globalization impact factors in the task-site allocation network.

10. An article of manufacture comprising a computer readable storage medium not including a signal having computer readable instructions tangibly embodied thereon which, when implemented, cause a computer to carry out a plurality of method steps comprising: generating a task-site allocation network comprising multiple nodes and multiple edges based on multiple site-task pairs and at least one site-centric constraint of at least two sites, wherein each node in the network represents an allocation of a task to a site and each edge connecting two nodes in the network represents a transfer of one or more software artifacts from one task to another task within a site and/or across sites, and wherein generating said task-site allocation network comprises: generating a task-specific constraints model based on task context information; and generating a task-site pair that satisfies at least one constraint based on the task-specific constraints model; and determining a preferred allocation of task to site by comparing estimated task-site allocation costs between a (i) single site allocation cost determined across one or more of the multiple nodes in the task-site allocation network that encompass the single site allocation and (ii) a distributed site allocation cost determined across at least two nodes of the multiple nodes in the task-site allocation network that encompass the distributed site allocation sites, wherein the cost associated with each node in the network comprises an effort of executing the corresponding task on the corresponding site, and wherein the cost associated with each edge in the network comprises an effort associated with transferring the one or more software artifacts between the two nodes connected by the edge.

11. The article of manufacture of claim 10, wherein the at least one site-centric constraint comprises at least one of task-related historical data on effort, site-task productivity, and an inter-site coordination factors.

12. The article of manufacture of claim 10, wherein task context information comprises at least one of effort, cost, schedule information, a site list, and historical information.

13. The article of manufacture of claim 10, wherein generating a task-site allocation network comprises filtering one or more unconnected task-site pairs in the network.

14. The article of manufacture of claim 10, wherein determining a preferred allocation of task to site comprises navigating the task-site allocation network to identify a list of at least one candidate task distribution models with a constraints satisfaction index.

15. A system for modeling a task-site allocation, comprising: at least one distinct software module, each distinct software module being embodied on a tangible computer-readable medium; a memory; and at least one processor coupled to the memory and operative for: generating a task-site allocation network comprising multiple nodes and multiple edges based on at-least-one multiple site-task pairs pair and at least one site-centric constraint of at least two sites, wherein each node in the network represents an allocation of a task to a site and each edge connecting two nodes in the network represents a transfer of one or more software artifacts from one task to another task within a site and/or across sites, and wherein generating said task-site allocation network comprises: generating a task-specific constraints model based on task context information; and generating a task-site pair that satisfies at least one constraint based on the task-specific constraints model; and determining a preferred allocation of task to site by comparing estimated task-site allocation costs between a (i) single site allocation cost determined across one or more of the multiple nodes in the task-site allocation network that encompass the single site allocation and (ii) a distributed site allocation cost determined across at least two nodes of the multiple nodes in the task-site allocation network that encompass the distributed site allocation, wherein the cost associated with each node in the network comprises an effort of executing the corresponding task on the corresponding site, and wherein the cost associated with each edge in the network comprises an effort associated with transferring the one or more software artifacts between the two nodes connected by the edge.

16. The system of claim 15, wherein the at least one site-centric constraint comprises at least one of task-related historical data on effort, site-task productivity, and an inter-site coordination factors.

17. The system of claim 15, wherein task context information comprises at least one of effort, cost, schedule information, a site list, and historical information.

18. The system of claim 15, wherein the at least one processor coupled to the memory operative for generating a task-site allocation network is further operative for filtering one or more unconnected task-site pairs in the network.

19. The system of claim 15, wherein the at least one processor coupled to the memory operative for determining a preferred allocation of task to site is further operative for navigating the task-site allocation network to identify a list of at least one candidate task distribution models with a constraints satisfaction index.

* * * * *